United States Patent
Topp

(10) Patent No.: US 6,678,994 B2
(45) Date of Patent: Jan. 20, 2004

(54) SANITARY AND PHYTOSANITARY PEST CONTROL METHOD BY CONTROLLED APPLICATION OF HEAT

(75) Inventor: Daniel P. Topp, West Chester, PA (US)

(73) Assignee: Topp Construction Services, Inc., Aston, PA (US)

( * ) Notice: Subject to any disclaimer, the term of this patent is extended or adjusted under 35 U.S.C. 154(b) by 0 days.

(21) Appl. No.: 10/044,567

(22) Filed: Jan. 11, 2002

(65) Prior Publication Data

US 2002/0194773 A1 Dec. 26, 2002

Related U.S. Application Data

(60) Provisional application No. 60/292,810, filed on May 22, 2001.

(51) Int. Cl.[7] ............................................... A01M 13/00
(52) U.S. Cl. ........................................................ 43/124
(58) Field of Search ............................................ 43/124

(56) References Cited

U.S. PATENT DOCUMENTS

| | | | | |
|---|---|---|---|---|
| 1,234,214 A | * | 7/1917 | Reynolds ...................... 43/138 |
| 4,457,292 A | * | 7/1984 | Jorgensen et al. ........ 126/21 A |
| 4,572,427 A | * | 2/1986 | Selfridge et al. ........... 165/146 |
| 4,640,044 A | * | 2/1987 | Varnon ........................ 126/714 |
| 4,676,152 A | * | 6/1987 | Tsuji et al. .................... 99/468 |
| 4,716,676 A | * | 1/1988 | Imagawa ...................... 422/26 |
| 4,817,329 A | * | 4/1989 | Forbes ......................... 43/124 |
| 5,041,298 A | * | 8/1991 | Wallace et al. ............. 426/418 |
| 5,058,313 A | * | 10/1991 | Tallon .......................... 43/124 |
| 5,203,108 A | * | 4/1993 | Washburn, Jr. .............. 43/124 |
| 5,789,007 A | * | 8/1998 | Bianco ........................ 426/263 |
| 5,792,419 A | * | 8/1998 | Williamson et al. ........... 422/1 |
| 5,941,233 A | | 8/1999 | Grinols et al. .......... 126/110 R |
| 6,141,901 A | * | 11/2000 | Johnson et al. ............... 43/124 |
| 6,171,561 B1 | | 1/2001 | Williamson et al. ........ 422/307 |
| 6,258,356 B1 | * | 7/2001 | Wilcox et al. ......... 424/93.461 |
| 6,279,261 B1 | * | 8/2001 | Binker et al. ................. 422/32 |

* cited by examiner

Primary Examiner—Charles T. Jordan
Assistant Examiner—Jordan M Lofdahl
(74) Attorney, Agent, or Firm—Mark A. Garzia

(57) ABSTRACT

A method of eradicating pests by the controlled application of heat for a predetermined period of time.

18 Claims, 1 Drawing Sheet

SANITARY AND PHYTOSANITARY PEST CONTROL METHOD BY CONTROLLED APPLICATION OF HEAT

CROSS-REFERENCE TO RELATED APPLICATION

This application claims benefit under any applicable statute of U.S. Provisional Application No. 60/292,810, titled SANITARY AND PHYTOSANITARY PEST CONTROL METHOD BY CONTROLLED APPLICATION OF HEAT filed May 22, 2001, by Daniel P. Topp.

FIELD OF THE INVENTION

The present invention relates generally to a method of eradicating pests and, in particular, a method using heat to eradicate pests from a variety of products.

BACKGROUND OF THE INVENTION

Wood products such as wood packing, pallets, dunnage, crating, blocks, cases, load boards, pallet collars, skids, plants and bulk food items are common carriers of non-resident pests (including termites, beetles, and other insects). Non-resident pests can devastate the forest ecosystems or timber production areas of both domestic and foreign countries.

All forests are particularly vulnerable to non-residential and exportation pests such as fungi, nematodes, or insects introduced through importation and exportation of logs, lumber, or non-manufactured wood articles. Because wood products produced in temperate areas outside of North America are afflicted with a wide variety of pests and diseases that are non-indigenous to this continent, they can be spread rapidly when introduced here. The primary reason is that natural predators of the pests in their indigenous regions are not present in North America. Conversely, wood products produced domestically can harbor pests and diseases which would be non-indigenous to other countries. Accordingly, special care is required to ensure that imported and exported wood and wood products are pest-free.

The introduction of non-indigenous pests and diseases could be detrimental to U.S. Forest Production, recreation, and urban forest resources. These pests bore into the roots, limbs, or trunk of a tree. The pests can interfere with a tree's reproductive capabilities, can cause defoliation, wood damage, and/or create a shift in or cause changes in habitat and food supply. In addition, establishment of non-indigenous organisms has clearly been shown to reduce biodiversity.

There are several historical examples in which the importation of non-indigenous timber pest species has led to widespread blights within the United States and worldwide. Notable cases last century have included: Chestnut blight (*Cryphonectria parasitica*, 1904–1955), Dutch Elm disease (caused by the fungus *Ophiostoma ulma*, mid-1920's), White Pine blister rust (fungus *Cronartuum ribicola*, early 1900's), Port Oxford Cedar root rot (fungus *Phytophthora lateralis*, 1923), and the recent Gypsy moth (*Lymantria dispar*, 1970's) outbreaks. Each of these outbreaks caused ecological damage such as shifts in species composition, changes in habitat, as well as tree defoliation, stress and death.

While the pesticide Methyl Bromide is currently being used to fumigate timber and wood products, it may not be the most effective treatment for controlling quarantined pests (e.g., bark beetles and borers, termites, and fungus) on imported or exported logs and lumber. Further, it is believed that Methyl Bromide does NOT penetrate effectively into wood that has a high moisture content. It is difficult to achieve useful insecticidal doses much beyond a depth of 100 millimeters in green materials using conventional tent fumigation techniques. Likewise, according to the USDA, "there is little scientifically derived efficacy data available to determine the most effective ways to employ Methyl Bromide fumigation to destroy plant pests associated with imported wood products." Additionally, recent test shipments of wood products imported into the U.S. that were fumigated with Methyl Bromide have been found to be infested with fungal pests upon arrival. Methyl Bromide, therefore, when used to treat logs and lumber, does NOT completely eradicate the risk of quarantined pests entering a new territory. Also the process and use of Methyl Bromide is being considered for a possible ban due to the detrimental environmental effects that this chemical has in people and the atmosphere and the lack of effectiveness it has had on this product range.

SUMMARY OF THE INVENTION

The subject invention relates to eradication of pests by the use of heat. While it is applicable to a wide range of pests including insect life, its most important application at the present time is the eradication of pests from products such as non-manufactured wood packing (e.g., pallets, dunnage, crating, packing blocks, cases, load boards, skids, etc.), paper products, appliances that hold and dispense foods or drinks (e.g. vending machines, water coolers, coffee machines), and machinery equipment, and commodities.

All pests, including insect life, have a temperature range within which it can survive and thrive. Temperatures appreciably above and below this range are lethal, and temperatures that are close to this range but still outside of the range will be lethal if maintained for a sufficiently long period of time. The causes of death vary from pest to pest. The precise mechanism by which the pest perishes is of no particular interest to the invention, but the fact that the pests perishes is the objective, and that it is killed without harm to the structure, environment or to people who utilize the structure.

The use of elevated temperatures to kill pests avoids the risks and inconveniences of using toxic gasses in fumigation techniques. There is no need to use anything but atmospheric air or other friendly gases, so that clean up after the process is unnecessary. The equipment is conventional and is operable by persons of few skills. Preparation for use in an occupied structure involves no more than removal of temperature sensitive material such as candles, and sometimes the placing of insulation matts.

This invention is a novel, effective, economical and safe means for exterminating pests and is accomplished by heating a region infested by pests to a suitably elevated temperature for a time sufficient to kill the pest but without harming the surrounding structure (e.g., a wood pallet) or the contents (e.g., bulk food). According to a preferred embodiment, a region to be treated is subjected to hot air for a period of time sufficient to raise the host material (the "region") temperature to the desired level, and to maintain it at that temperature for a suitable period of time. The "region" to be treated may of course be only indirectly approached by the air itself. For example, the inside of an infested post will not directly be contacted by the air, but will be heated by heat conducted from the surface of the post, which is exposed to the convected air. The heated air will then be contained in a volume such as a room or other enclosed space.

A unique method in which products or materials, including but not limited to wood packing, pallets, dunnage, crating, blocks, cases, load boards, pallet collars, skids, machinery, or commodities, are placed in, or surrounded by, a controllable environment, which kills pests, molds, and fungus by heating them and their immediate environment in accordance with a specific time-temperature schedule that achieves a minimum core temperature of 56 degrees Celsius (133 degrees Fahrenheit) for thirty minutes or longer as required.

Heat treatment can be a very effective method for the eradication of pests without the drawbacks of fumigation e.g., highly toxic chemicals, airtight fumigation containment, certified pest controller(s), and lengthy treatment/clearing times. Numerous studies have documented that temperatures at or above 49 degrees Celsius (120 degrees Fahrenheit) for thirty minutes are lethal to most pests.

The above and other features of this invention will be fully understood from the following detailed description and the accompanying drawings.

BRIEF DESCRIPTION OF THE DRAWINGS

The accompanying drawings, which are incorporated in and form a part of the specification, illustrate the embodiments of the present invention and, together with the description, serve to explain the principles of the invention.

In the drawings.

DETAILED DESCRIPTION OF THE PREFERRED EMBODIMENT

Figure 1:
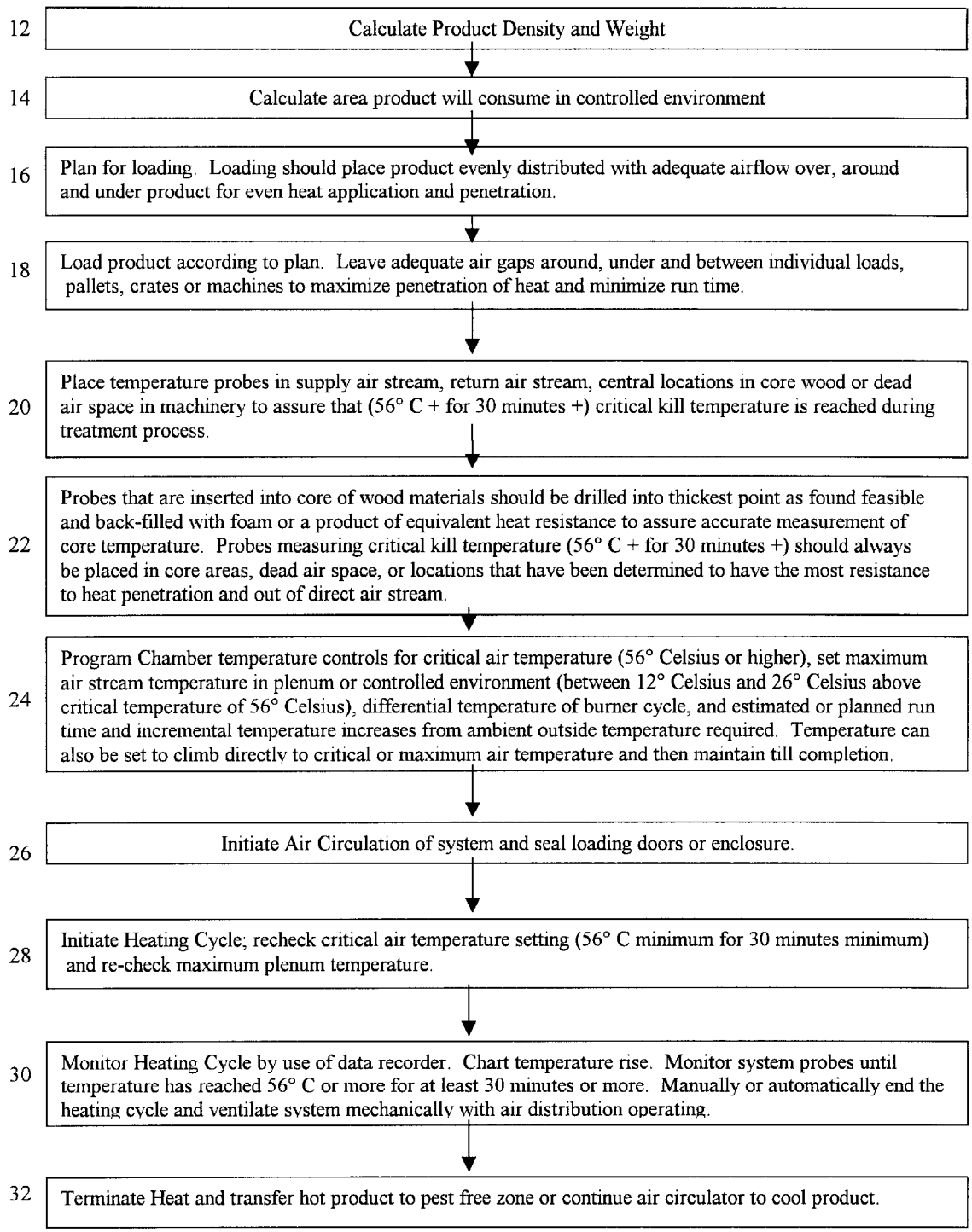
FIG. 1 is a flow chart representing the steps involved in eradicating pests from products using an enclosed environment in accordance with the present invention.

In describing a preferred embodiment of the invention, specific terminology will be selected for the sake of clarity. However, the invention is not intended to be limited to the specific terms so selected, and it is to be understood that each specific term includes all technical equivalents that operate in a similar manner to accomplish a similar purpose.

Preferred embodiments of the present invention will now be described in detail with reference to the accompanying drawings in which a method of eradicating pests from products in accordance with the present invention will be described herein.

For the purpose of this patent, the term "pest" shall be defined as, but not limited to, any unwanted living organism susceptible to eradication by means of heat (e.g., insects, biological organism, mold, fungus, anthrax, etc.)

For the purpose of this patent, the term "heater" shall be defined as, but not limited to; any device that has the means to raise/increase the temperature of air or a given substance either directly or indirectly, through conduction, convection, or radiation. The source of heat can be derived from the means of a combustible fossil fuel (e.g. propane, natural gas, heating oil, etc.) electricity, steam, coal, wood, or nuclear reaction.

For the purpose of this patent, the term "products" shall be defined as, but not limited to, non-manufactured wood packing (e.g., pallets, dunnage, crating, packing blocks, cases, load boards, skids, etc.), paper products, appliances that hold and dispense foods or drinks (e.g. vending machines, water coolers, coffee machines), and machinery equipment, and commodities.

The following terms and their meanings will be used in this specification for convenience only and it is not intended to be limiting.

Phytosanitary: "Procedure having purpose to prevent the introduction of and/or spread of pests."

Heat Treatment: "The process in which a product is heated until it reaches a specific minimum temperature for a minimum period of time as measured at a specific location in or on the commodity." (International Standards for Phytosanitary Measures, May 2001.) In a preferred embodiment, heat treatment is a method of heating products in accordance with a specific time-temperature schedule that achieves a minimum wood core temperature of 56 degrees Celsius for a minimum of thirty minutes.

A minimum core temperature of 56 degrees Celsius (133 degrees Fahrenheit) for a minimum of thirty minutes is chosen in consideration of the wide range of pests for which this combination is documented to be lethal and a commercially feasible treatment. Although it is recognized that some pests have a higher thermal tolerance, quarantined pests in this category are managed by the National Plant Protection Organization (NPPO) on a case-by-case basis. It is noted that the absence of bark is not required.

Commodity: A type of plant, plant product, or other article being moved for trade or other trade purposes.

Plant and animal health measures—also known as sanitary (human and animal health) and phytosanitary (plant health) measures—are vitally important. In accordance with a preferred embodiment of the present invention, the treatment of products with heat for the purpose of eradicating pests will be described by referring to FIG. 1.

The first step in eradicating pests from a product is to select an enclosed environment, be it a room, a chamber or other structure. In the preferred embodiment, the structure is insulated to promote efficiency and therefore reduce heating costs.

In accordance with Box 12 of FIG. 1, the product density and weight must be calculated. The density and weight of the product will eventually determine the amount of heat needed and the period of time to apply said heat.

As referenced in Box 14, the volume the product will occupy must be calculated.

Next as presented in Boxes 16 and 18, a plan for loading the product within an enclosed environment must be planned and the enclosed environment must be loaded according to the plan. Adequate air gaps must be left around, under and between individual loads to maximize penetration of the heated air, to minimize the time heat is applied to the product, and to allow a more even heat distribution throughout the enclosed environment.

In one embodiment, a forced air heating system will be used to heat the enclosed environment. A typical forced air heating system has a supply air stream and a return air stream.

Temperature probes are placed in the supply air stream, return air stream and between the product as indicated in Boxes 20 and 22 of FIG. 1. This provides a record that all of the product was exposed to a predetermined temperature for a predetermined period of time.

If wood packing material, such as pallets, are to be treated, temperature probes are inserted into the core of the wood materials at their widest points or at a point of greatest density. (This is because wood is an insulator and does not conduct heat very well.) In the preferred embodiment, the drilled holes are backfilled with foam or a product of equivalent insulation capability thus preventing heat transfer through the point or hole where the probes were inserted. This ensures accurate measurement of the core temperature.

Temperature probes must be placed in core areas, dead air space and other locations that have been determined to have the greatest resistance to heat penetration and out of the direct air stream.

Referring now to Box 24 of FIG. 1, the temperature controls of the heater are set to bring the interior of enclosed environment to at least 56 degrees Celsius (133 degrees Fahrenheit) for at least thirty minutes. In the preferred embodiment, this is done with a direct or indirect fired heater.

The loading doors of the environment are closed and sealed as indicated by Box 26.

Referring to Box 30, the heating cycle is initiated. The critical air temperatures and maximum plenum temperatures are rechecked periodically.

The heating cycle is monitored by reading the value output by each probe. The temperature rise is charted. When the interior of the environment has been raised to at least 56 degrees Celsius for at least thirty minutes, terminate the heating cycle. Circulation of the air by internal fans may continue until the products return to ambient temperature.

The above process has been verified by conducting the following tests on the indicated products.
Actual Test Results are Presented Below:

Heat Treating Pallets of Macaroni-commodity

Eight 1,000-pound pallets of 20-pound poly pack elbow macaroni were loaded into the chamber (a controlled environment) for heat treatment. Temperature sensing devices (e.g., thermocouples, etc.) connected to a datalogger (e.g., a printer, electronic media recorder, etc.) were placed throughout the product.

Within forty hours of heating, all pasta boxes reached the target temperature of 49 degrees Celsius (120 degrees Fahrenheit) with none of the pasta exceeding a temperature of 60 degrees Celsius (140 degrees Fahrenheit) (our desired upper limit). The total energy cost (electric rate of 9 cents/kw-hour, and propane cost of 17 cents/gal) was approximately $16 or 40 cents/hr.

Independent laboratory tests indicated that the quality of the pasta products was not adversely affected when tested for color, firmness, and cooking characteristics.

Mortality of Heat Treated Stored Product Pests Commodity

Four commonly found insect species (adult confused flour beetles, saw toothed grain beetle, granary weevil, and larval warehouse beetle) were placed within boxes of pasta throughout the eight pallets and subjected to the heat treatment. None of the 1205 insects tested survived the heat treatment.

Heat Treating Wooden Pallets-Wood Products

Wooden pallets were heat-treated under two temperature trials, 71 degrees Celsius (160 degrees Fahrenheit) and 76.5 degrees Celsius (170 degrees Farenheit). Temperature of the pallets was measured by inserting thermocouples into small holes drilled into the midpoint of the pallets' thickest wood members, typically 1.25 inches thick by 3.5 inches. Pallet dimensions were typically 42"(inches) wide×48"(inches) deep×approximately 4.7"(inches) in height.

In the 71 degrees Celsius (160 degrees Fahrenheit) treatment trial, the target temperature of 49 degrees Celsius (120 degrees Fahrenheit) was reached in all pallets in the chamber within approximately 2.5 hours. The energy costs for heat-treating sixty wooden pallets was approximately 3 cents/pallet.

In the 76.5 degrees Celsius (170° F.) trial, target temperature of 49 degrees Celsius (120° F.) was reached in all pallets after approximately 1.5 hours of heating.

Mortality results of stored product pests placed in resealed pasta product[a] boxes, which were enclosed in 20-pound boxes of poly. Elbow macaroni exposed to chamber air temperature of 140° F. (60° C.).

| Pasta Box No. | Insect Type (No. Of Insects) | No. Of Insects Recovered | % Mortality |
|---|---|---|---|
| 1 | Granary weevil (50) | 50 | 100 |
|   | Confused flour beetle (50) | 50 | 100 |
| 2 | Granary weevil (50) | 50 | 100 |
|   | Confused flour beetle (50) | 50 | 100 |
| 3 | Saw-toothed grain beetle (50) | 43[b] | 100 |
|   | Confused flour beetle (50) | 50 | 100 |
| 4 | Saw-toothed grain beetle (50) | 50 | 100 |
|   | Confused flour beetle (50) | 50 | 100 |
| 5 | Saw-toothed grain beetle (50) | 43[b] | 100 |
|   | Confused flour beetle (50) | 50 | 100 |
| 6 | Saw-toothed grain beetle (50) | 33[b] | 100 |
|   | Confused flour beetle (50) | 50 | 100 |

[a]Pasta Product Types: 1. Mueller's Enriched Macaroni Product (Italian-style Ziti), 16 oz. (1 lb.), 454. g. 2. Creammett Elbow Macaroni (enriched), 16 oz. (1 lb.), 454 g. 3. ACME Rainbow Rotini (enriched spinach and tomato product), 12 oz. (¾ lb.), 340 g.
[b]Missing insects are attributed to being lost in the product during sorting and/or only recovering parts of a whole insect.

Although this invention has been described and illustrated by reference to specific embodiments, it will be apparent to those skilled in the art that various changes and modifications may be made which clearly fall within the scope of this invention. The present invention is intended to be protected broadly within the spirit and scope of the appended claims.

I claim:

1. A method of eradicating pests in a product, the method comprising the steps of:
   a. providing an enclosed environment that can contain bulk product;
   b. calculating product density;
   c. determining product weight;
   d. calculating product volume;
   a. calculating amount of energy needed to heat product to a pre-determined temperature for a pre-determined period of time;
   f. loading bulk product within said enclosed environment;
   g. placing temperature probes within the enclosed environment in order to obtain the temperature of the air within the enclosed environment;
   h. placing additional temperature probes amongst the product in order to obtain the approximate temperature of the product;
   i. heating the air within said enclosed environment to a specified temperature for a specified period of time;
   j. circulating heated air in said enclosed environment thus heating the loaded bulk product to said pre-determined temperature for said pre-determined period of time until all target pests have been eradicated and without product degradation;
   k. monitoring the heating of the product during the heating and circulating steps; and
   l. terminating maid heating step when the temperature of said product reaches the predetermined temperature for the predetermined period of time.

2. The method of claim 1 wherein the product within the enclosed environment is heated to at least 56 degrees Celsius (133 degrees Fahrenheit) for at least a period of thirty minutes.

3. The method of claim 2, after the step of loading the product and before the step of heating the air, further comprising the step of:

arranging the product within the enclosed environment to maintain maximum air flow for delivering heated air to the product and for ensuring generally even temperatures throughout said product.

4. The method of claim 3, after the step of terminating said heating, further comprising the step of:

allowing the product to cool to about room temperature.

5. The method of claim 4, further comprising the step of:

removing the product from the enclosed environment after the temperature of the product has cooled to about room temperature.

6. The method of claim 2 wherein said product is a bulk food item.

7. The method of claim 6 wherein said bulk food item is a macaroni product.

8. The method of claim 2 wherein said product is sundry machinery.

9. The method of claim 8, wherein said sundry machinery includes soda machines, cigarette machines, coffee machines, water coolers, other vending machines and general machinery.

10. The method of claim 1 wherein the product within the enclosed environment is heated to at least 49 degrees Celsius (120 degrees Fahrenheit) for at least a period of thirty minutes.

11. The method of claim 1 wherein the product within the enclosed environment is heated to the minimum temperature required to eradicate pests and for the minimum time period, said minimum temperature and minimum time period prescribed by worldwide accepted standards, government standards and/or scientific research.

12. A method of eradicating pests in wood products, the method comprising the steps of:

a. providing an enclosed environment that can contain wood products;
b. calculating product density;
c. determining product weight;
d. calculating product volume;
e. calculating amount of energy needed to heat said wood products to a pre-determined temperature for a pre-determined period of time so that target pests have been eradicated and without product degradation;
f. loading product within said enclosed environment;
g. drilling a plurality of holes in said wood products;
h. inserting a temperature probe into one or more of said drilled holes;
i. connecting said probes to a temperature monitoring device;
j. back-filling with an insulative material all holes in which a temperature probe is inserted;
k. heating the air within said enclosed environment to a specified temperature for a specified period of time;
l. circulating heated air within said enclosed environment thus heating the loaded product to said pre-determined temperature far said pre-determined period of time; and
m. terminating said heating step when the temperature of said wood products reaches the predetermined temperature for the predetermined period of time.

13. The method of claim 12 wherein the product within the enclosed environment is heated to at least 56 degrees Celsius (133 degrees Fahrenheit) for at least a period of thirty minutes.

14. The method of claim 12, wherein the product within the enclosed environment is heated to at least 49 degrees Celsius (120 degrees Fahrenheit) for at least a period of thirty minutes.

15. The method of claim 12 wherein said wood products are non-manufactured wood packing.

16. The method of claim 15 wherein said non-manufactured wood packing includes pallets, dunnage, cases, load boards, pallet collars and skids.

17. The method of claim 12 wherein the wood products within the enclosed environment are heated to the minimum temperature required to eradicate pests and for the minimum time period, said minimum temperature and minimum time period prescribed by worldwide accepted standards, government standards and/or scientific research.

18. The method of claim 1 wherein the heated air is provided by a supply air stream, and circulating the air includes a return air stream and further comprising the step of placing temperature probes in the supply air stream and the return air stream.

* * * * *

UNITED STATES PATENT AND TRADEMARK OFFICE
CERTIFICATE OF CORRECTION

PATENT NO. : 6,678,994 B2
DATED : January 20, 2004
INVENTOR(S) : Topp, Daniel P.

It is certified that error appears in the above-identified patent and that said Letters Patent is hereby corrected as shown below:

Column 6,
Line 65, delete "maid" and substitute therefor -- said --.

Column 8,
Line 17, Delete "far" and substitute therefor -- for --.

Signed and Sealed this

Twenty-seventh Day of July, 2004

JON W. DUDAS
*Acting Director of the United States Patent and Trademark Office*